United States Patent
Pitts et al.

(10) Patent No.: US 10,263,277 B2
(45) Date of Patent: Apr. 16, 2019

(54) FLEXIBLE THIN FILM SOLID STATE LITHIUM ION BATTERIES

(75) Inventors: John Roland Pitts, Lakewood, CO (US); Se-Hee Lee, Louisville, CO (US); C. Edwin Tracy, Golden, CO (US)

(73) Assignee: Alliance for Sustainable Energy, LLC, Golden, CO (US)

(*) Notice: Subject to any disclaimer, the term of this patent is extended or adjusted under 35 U.S.C. 154(b) by 569 days.

(21) Appl. No.: 12/808,459

(22) PCT Filed: Feb. 25, 2008

(86) PCT No.: PCT/US2008/054897
§ 371 (c)(1),
(2), (4) Date: Jun. 16, 2010

(87) PCT Pub. No.: WO2009/108185
PCT Pub. Date: Sep. 3, 2009

(65) Prior Publication Data
US 2011/0117417 A1    May 19, 2011

(51) Int. Cl.
*H01M 10/04* (2006.01)
*H01M 10/05* (2010.01)
(Continued)

(52) U.S. Cl.
CPC ....... *H01M 10/052* (2013.01); *H01M 4/0438* (2013.01); *H01M 4/131* (2013.01);
(Continued)

(58) Field of Classification Search
CPC .......... H01M 10/045; H01M 10/0459; H01M 10/052
(Continued)

(56) References Cited

U.S. PATENT DOCUMENTS 5,498,489 A * 3/1996 Dasgupta .......... H01M 10/0413
429/152
5,512,147 A   4/1996 Bates et al.
(Continued)

FOREIGN PATENT DOCUMENTS

CA    2520042 A1   3/2006
FR    2867311 A1   9/2005
(Continued)

OTHER PUBLICATIONS

Dictionary Definition of the Word Adjacent.*
(Continued)

*Primary Examiner* — Ula C Ruddock
*Assistant Examiner* — Frank A Chernow
(74) *Attorney, Agent, or Firm* — Michael A. McIntyre; John C. Stolpa

(57) ABSTRACT

Exemplary flexible thin film solid state lithium ion batteries (10) and methods for making the same are disclosed. An exemplary flexible solid state thin film electrochemical device (10) may include a flexible substrate (12), first (14) and second electrodes (18), and an electrolyte (16) disposed between the first (14) and second electrodes (18). The electrolyte (16) is disposed on the flexible substrate (12). The first electrode (14) is disposed on the electrolyte (16), and the second electrode (18) having been buried between the electrolyte (16) and the substrate (12).

14 Claims, 10 Drawing Sheets

(51) Int. Cl.
*H01M 10/052* (2010.01)
*H01M 4/04* (2006.01)
*H01M 4/131* (2010.01)
*H01M 4/1391* (2010.01)
*H01M 10/0585* (2010.01)

(52) U.S. Cl.
CPC ..... *H01M 4/1391* (2013.01); *H01M 10/0436* (2013.01); *H01M 10/0585* (2013.01); *H01M 2300/0065* (2013.01); *H01M 2300/0094* (2013.01); *Y10T 29/49115* (2015.01)

(58) Field of Classification Search
USPC ........................................................ 429/149
See application file for complete search history.

(56) References Cited

U.S. PATENT DOCUMENTS

| | | | |
|---|---|---|---|
| 5,569,520 | A | 10/1996 | Bates |
| 5,597,660 | A | 1/1997 | Bates et al. |
| 5,612,152 | A | 3/1997 | Bates |
| 6,805,999 | B2 | 10/2004 | Lee et al. |
| 6,835,493 | B2 | 12/2004 | Zhang et al. |
| 6,982,132 | B1 | 1/2006 | Goldner et al. |
| 2003/0160589 | A1* | 8/2003 | Krasnov et al. ............ 320/107 |
| 2003/0162094 | A1* | 8/2003 | Lee et al. ................ 429/231.95 |
| 2004/0018422 | A1 | 1/2004 | Islam et al. |
| 2004/0023106 | A1* | 2/2004 | Benson ................. H01M 6/187 429/122 |
| 2004/0048157 | A1 | 3/2004 | Neudecker et al. |
| 2006/0088759 | A1 | 4/2006 | Roh |
| 2006/0159978 | A1 | 7/2006 | Song et al. |
| 2007/0015060 | A1* | 1/2007 | Klaassen ................ H01B 1/122 429/309 |
| 2007/0111044 | A1 | 5/2007 | Chang |
| 2007/0117008 | A1 | 5/2007 | Kaneko et al. |

FOREIGN PATENT DOCUMENTS

| | | |
|---|---|---|
| JP | 60-21175 U1 | 2/1985 |
| JP | 3015171 | 1/1991 |
| JP | 2001-126967 | 5/2001 |
| KR | 2006-0124978 | 12/2006 |
| WO | 2003023880 A2 | 3/2003 |

OTHER PUBLICATIONS

International Search Report dated Sep. 24, 2008, for International Application No. PCT/US2008/054897.

International Preliminary Report on Patentability and Written Opinion of the International Searching Authority, dated Sep. 24, 2008, for International Application No. PCT/US2008/054897.

Extended European Search Report for European Patent Application No. 08730655.1, dated Apr. 8, 2013, pp. 1-5.

* cited by examiner

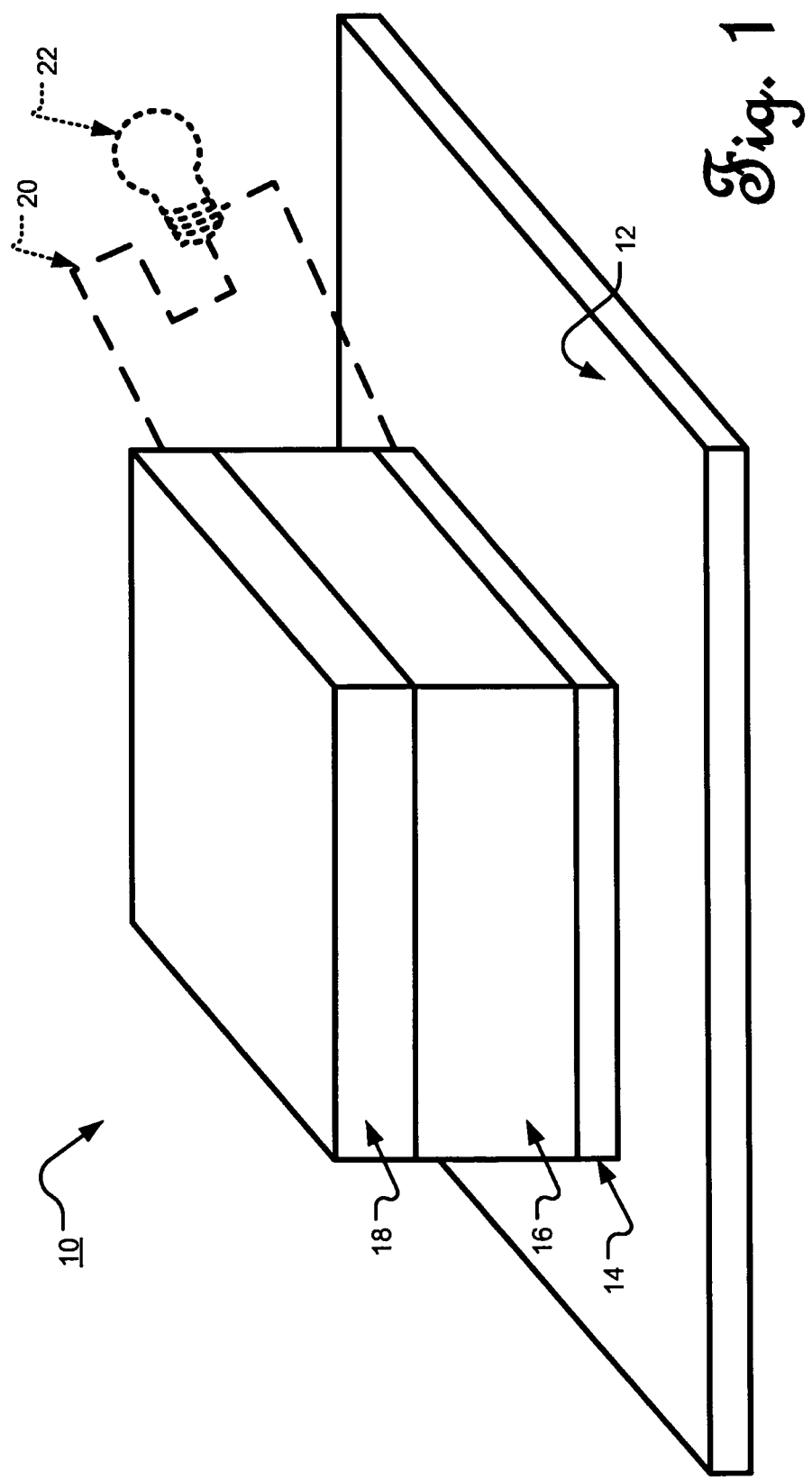

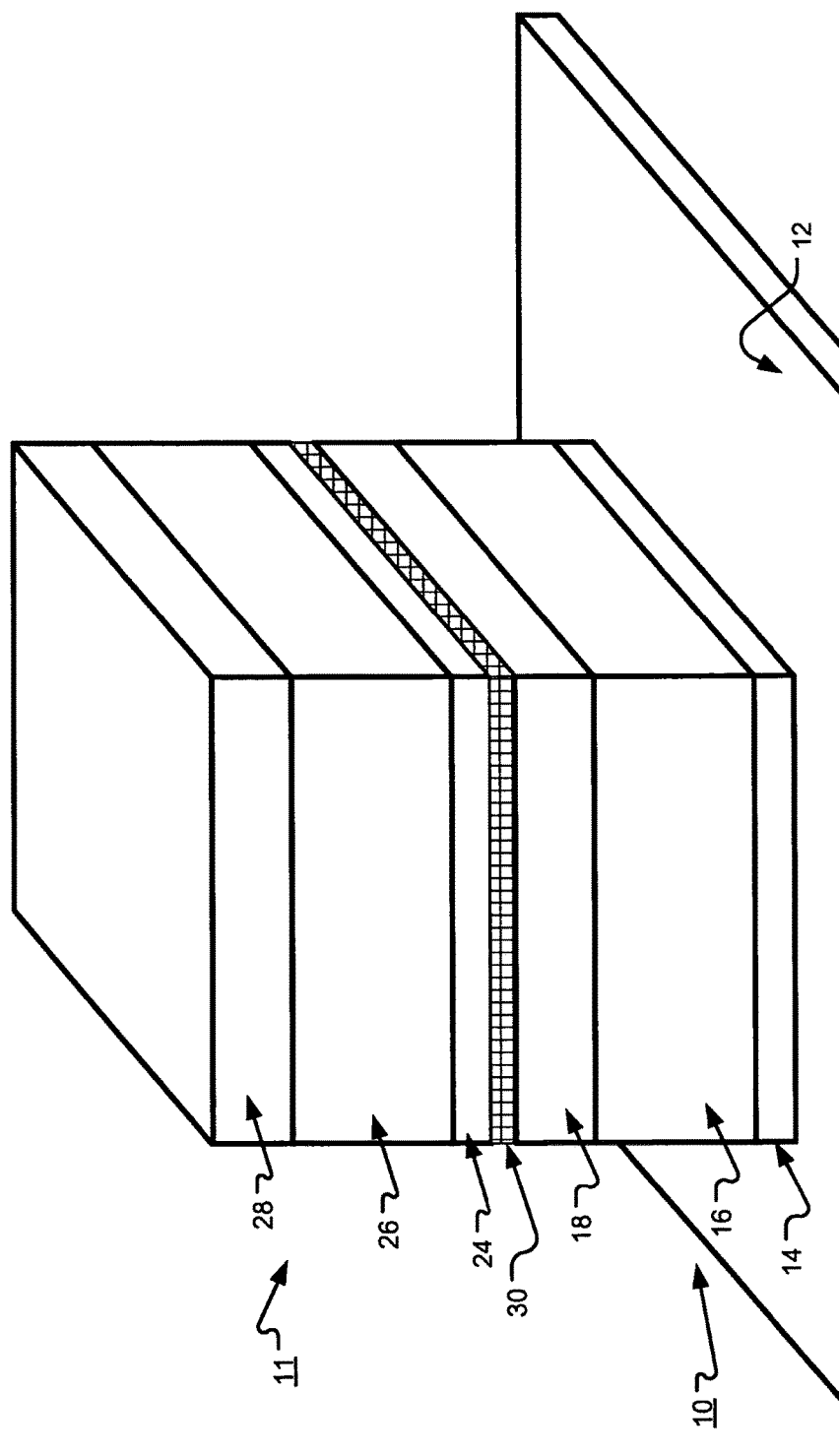

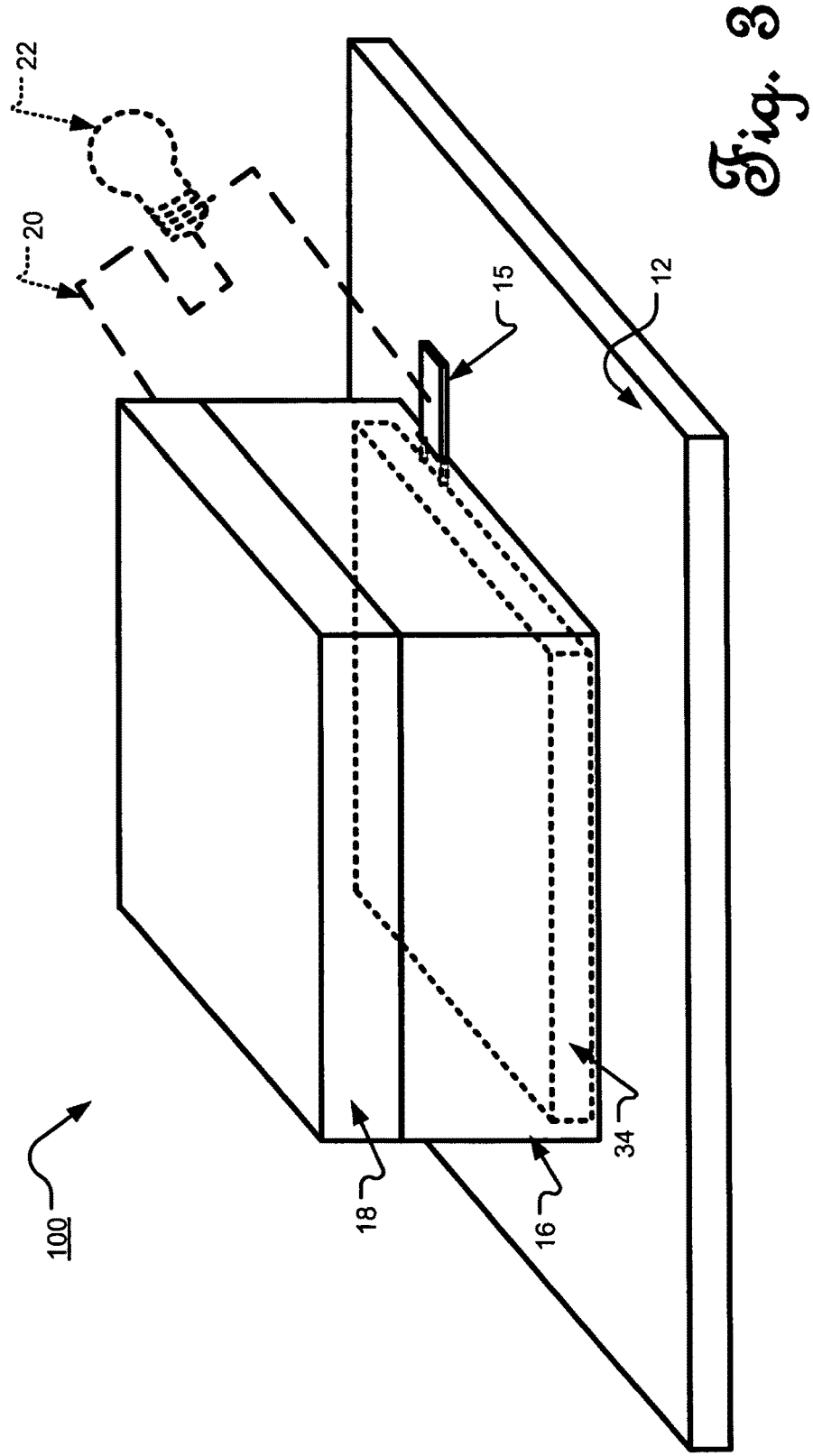

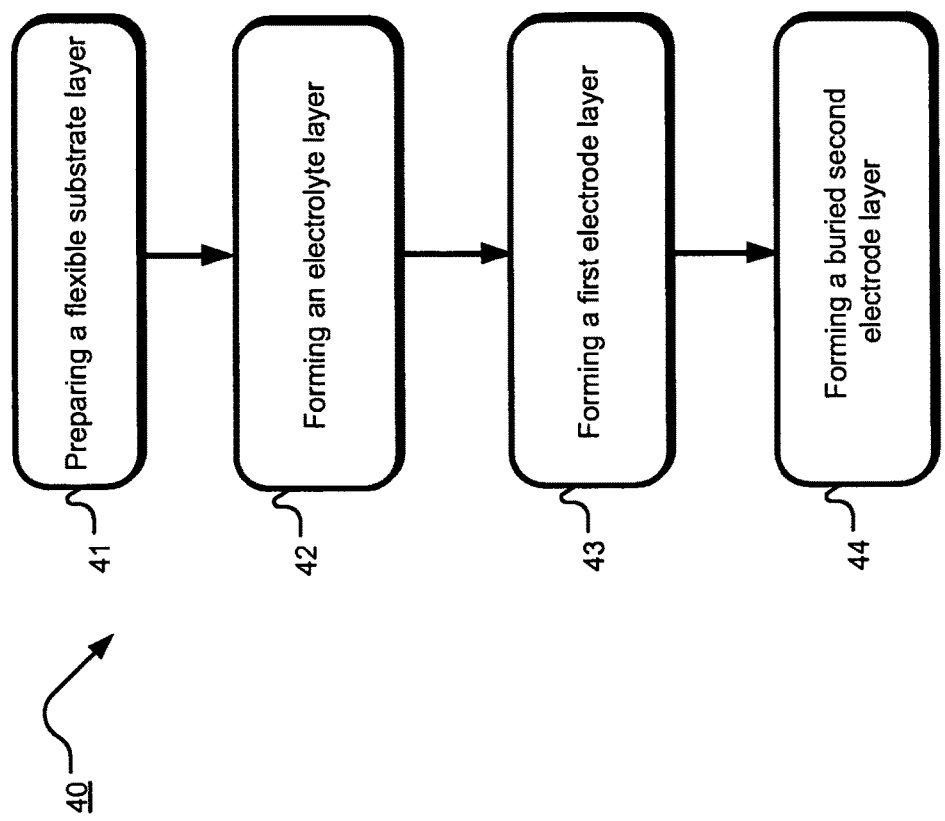

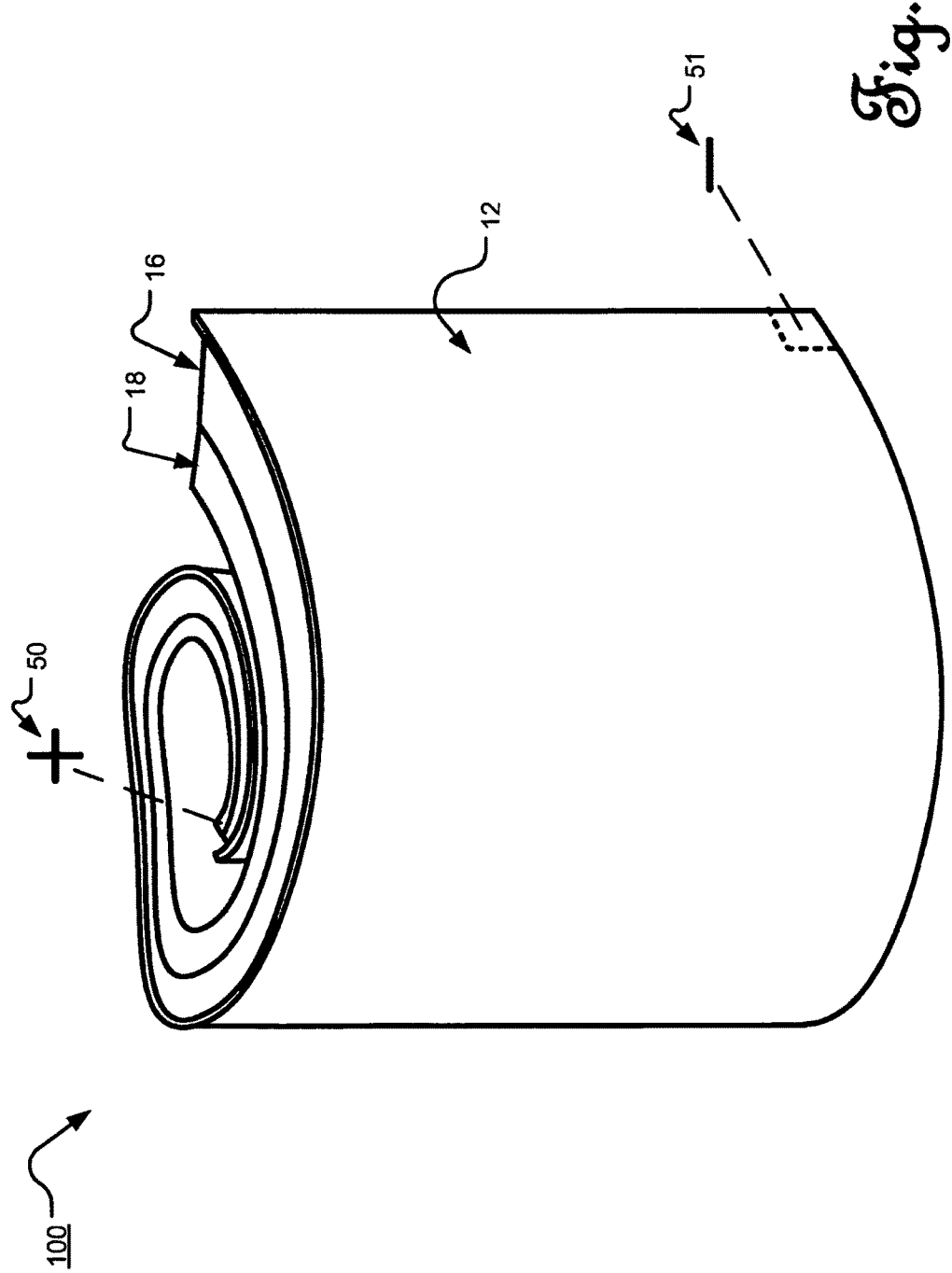

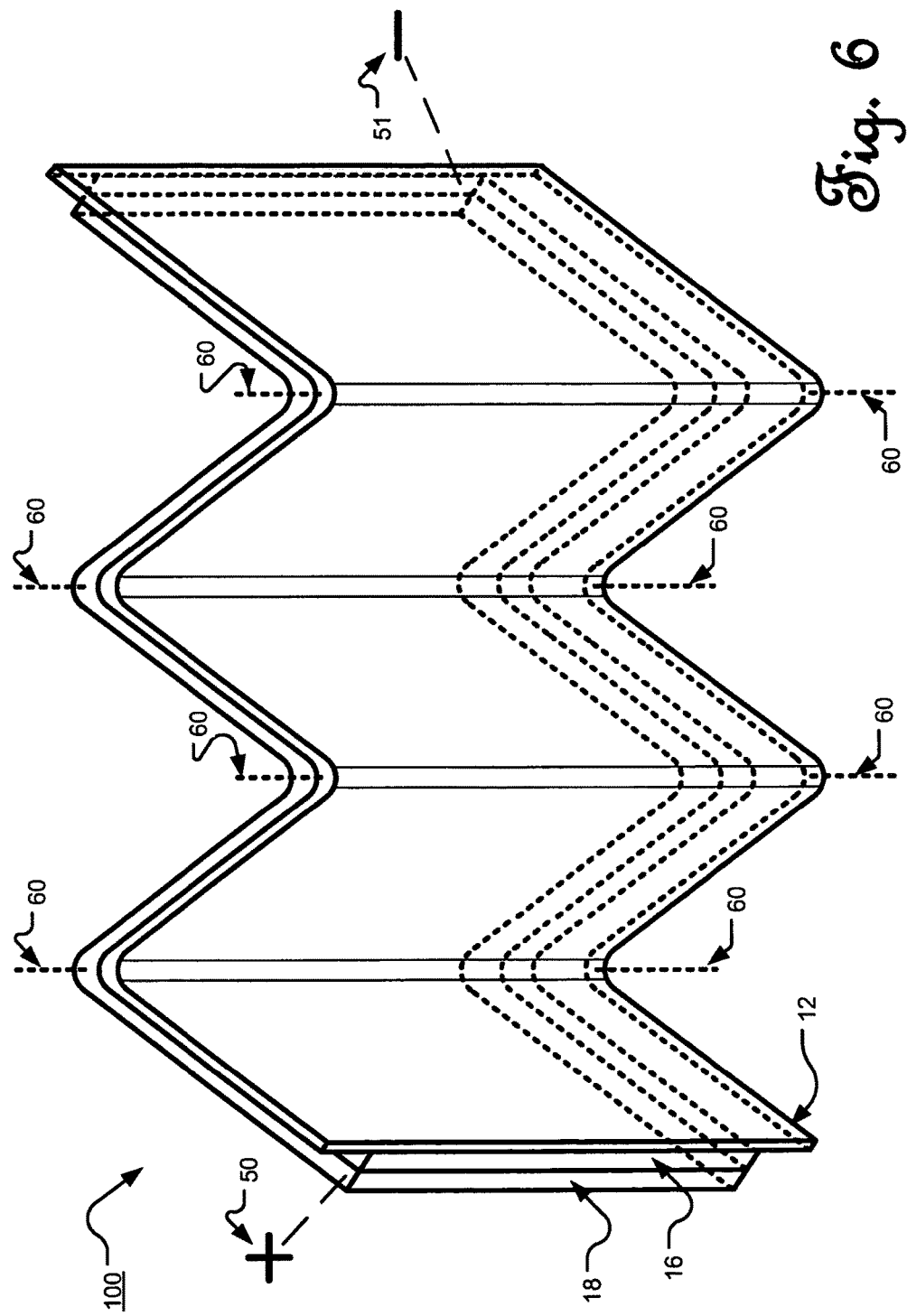

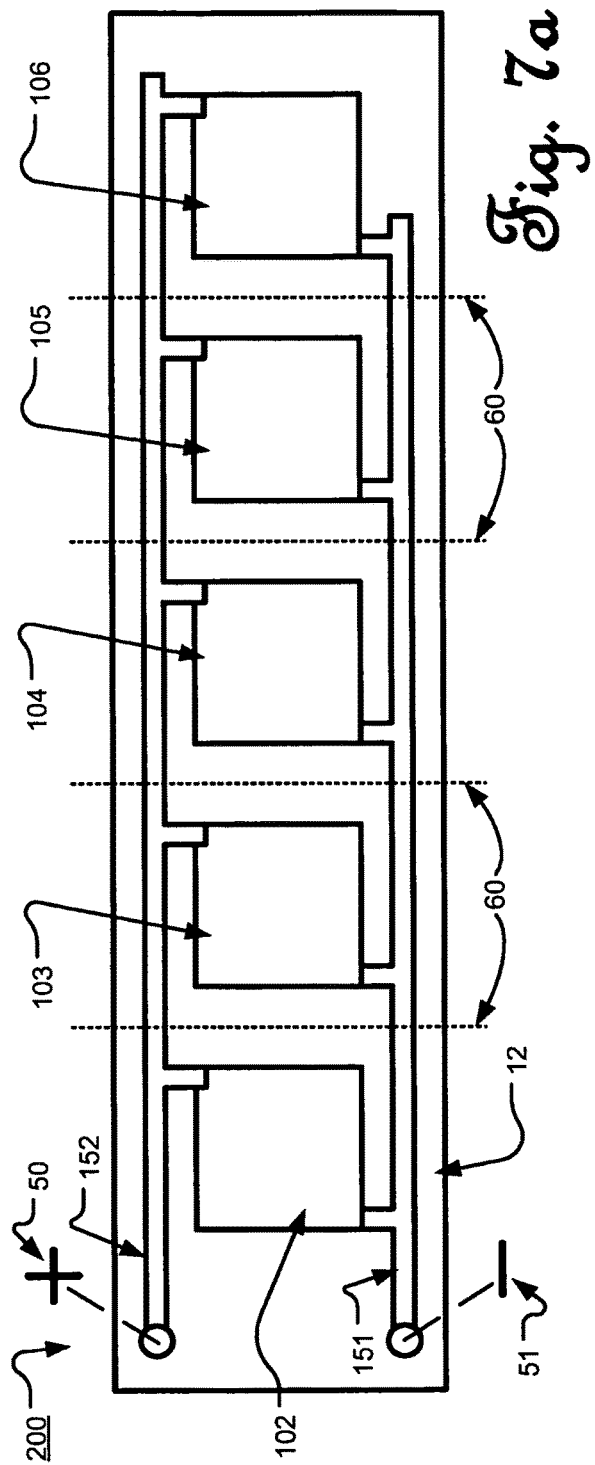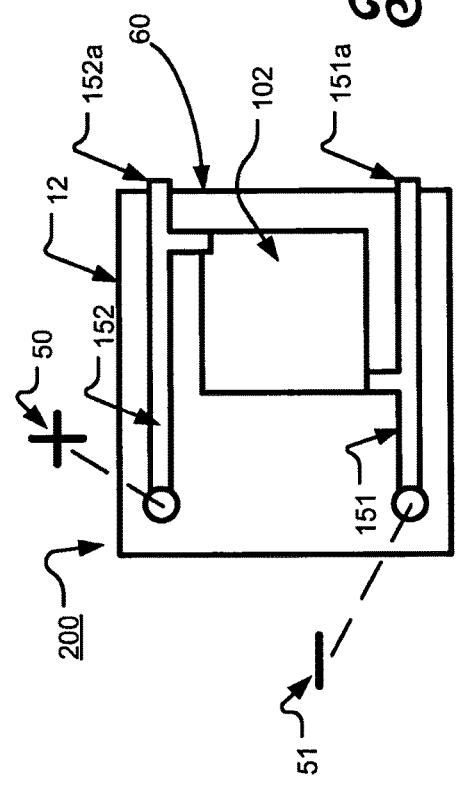

FLEXIBLE THIN FILM SOLID STATE LITHIUM ION BATTERIES

The United States Government has rights in this invention under Contract No. DE-AC36-99GO10337 between the United States Department of Energy and the National Renewable Energy Laboratory, a Division of the Midwest Research Institute.

BACKGROUND

Batteries are electrochemical cells which store and supply electrical energy as a product of a chemical reaction. In their simplest conceptualization, batteries have two electrodes, one that supplies electrons by virtue of an oxidation process occurring at that electrode, termed the anode (hereinafter, "anodic processes"), and a second one that consumes electrons by virtue of a reduction process occurring at that electrode, termed the cathode (hereinafter, "cathodic processes"). Thin film ion batteries, including those of the thin film solid state lithium ion type, can be prepared from various deposition techniques to fabricate anode, cathode, and electrolyte materials bonded together to form the battery, individual cells of which may typically be less than about 25 microns in thickness. Such techniques may typically include depositing thin films of such materials using vacuum deposition or other techniques that result in similar thin films, to produce the "thin film" batteries. Thin film batteries are often employed in applications in which space and weight may preferably be conserved and extremely long cycle life may be desired.

Lithium anodes have presented issues in past lithium thin film battery techniques due to the high reactivity of lithium; however, a buried lithium anode was described in U.S. Pat. No. 6,805,999 (which has co-ownership and co-inventor overlap herewith), to provide stable thin film, solid state, lithium anode batteries. Note, U.S. Pat. No. 6,805,999 is incorporated herein by this reference as if fully set forth here for all that it teaches and suggests.

Moreover, the prior art has begun to address an additional desideratum of increasing thin film battery capacity and/or current delivery. In one track, it has been found desirable to increase the amount of lithium in a battery; however, it has been found that many materials used in thin film solid state applications cannot be structurally effective at larger sizes. For example, a good solid state electrolyte, lithium phosphorus oxynitride (also known as LiPON) is a brittle ceramic subject to cracking when subject to moderate expansion. A further alternative is in the provision of flexible materials for thin film electronic devices such as might include batteries. However, successful lithium ion, thin film, solid state battery techniques do not yet appear to have been successfully achieved in flexible forms.

SUMMARY

The following implementations and aspects thereof are described and illustrated in conjunction with systems, tools and methods which are meant to be exemplary and illustrative, not limiting in scope. In various implementations, one or more of the above-described issues have been reduced or eliminated, while other implementations are directed to other improvements.

An exemplary embodiment may include a flexible solid state thin film electrochemical device including a flexible substrate; first and second electrodes; and, an electrolyte disposed between the first and second electrodes, the electrolyte disposed on the flexible substrate; the first electrode disposed on the electrolyte and the second electrode having been buried between the electrolyte and the substrate.

Another exemplary embodiment may include flexible stacking of thin film solid state batteries to produce bulk-like battery properties.

The foregoing specific aspects and advantages of the present developments are illustrative of those which can be achieved by these developments and are not intended to be exhaustive or limiting of the possible advantages which can be realized. Thus, those and other aspects and advantages of these developments will be apparent from the description herein or can be learned from practicing the disclosure hereof, both as embodied herein or as modified in view of any variations which may be apparent to those skilled in the art. Thus, in addition to the exemplary aspects and embodiments described above, further aspects and embodiments will become apparent by reference to the drawings and by study of the following descriptions.

BRIEF DESCRIPTION OF DRAWINGS

Exemplary implementations are illustrated in referenced figures of the drawings. It is intended that the embodiments and figures disclosed herein are to be considered illustrative rather than limiting. In the drawings:

FIG. 1 is a schematic isometric view of some basic components of an exemplary thin film battery device;

FIG. 2 is a schematic isometric view of another exemplary thin film battery device;

FIG. 3 is a schematic isometric view of another exemplary thin film battery device;

FIG. 4 is a flow chart of an exemplary method of fabrication;

FIG. 5 is a schematic isometric view of yet another exemplary thin film battery device;

FIG. 6 is a schematic isometric view of still another exemplary thin film battery device;

FIG. 7, which includes sub-part FIGS. 7a and 7b, provides schematic plan views of one further exemplary thin film battery device; and, FIG. 8, which includes sub-part FIGS. 8a, 8b and 8c, provides schematic plan views of still one further exemplary thin film battery device hereof.

DETAILED DESCRIPTION

Figure 8A:
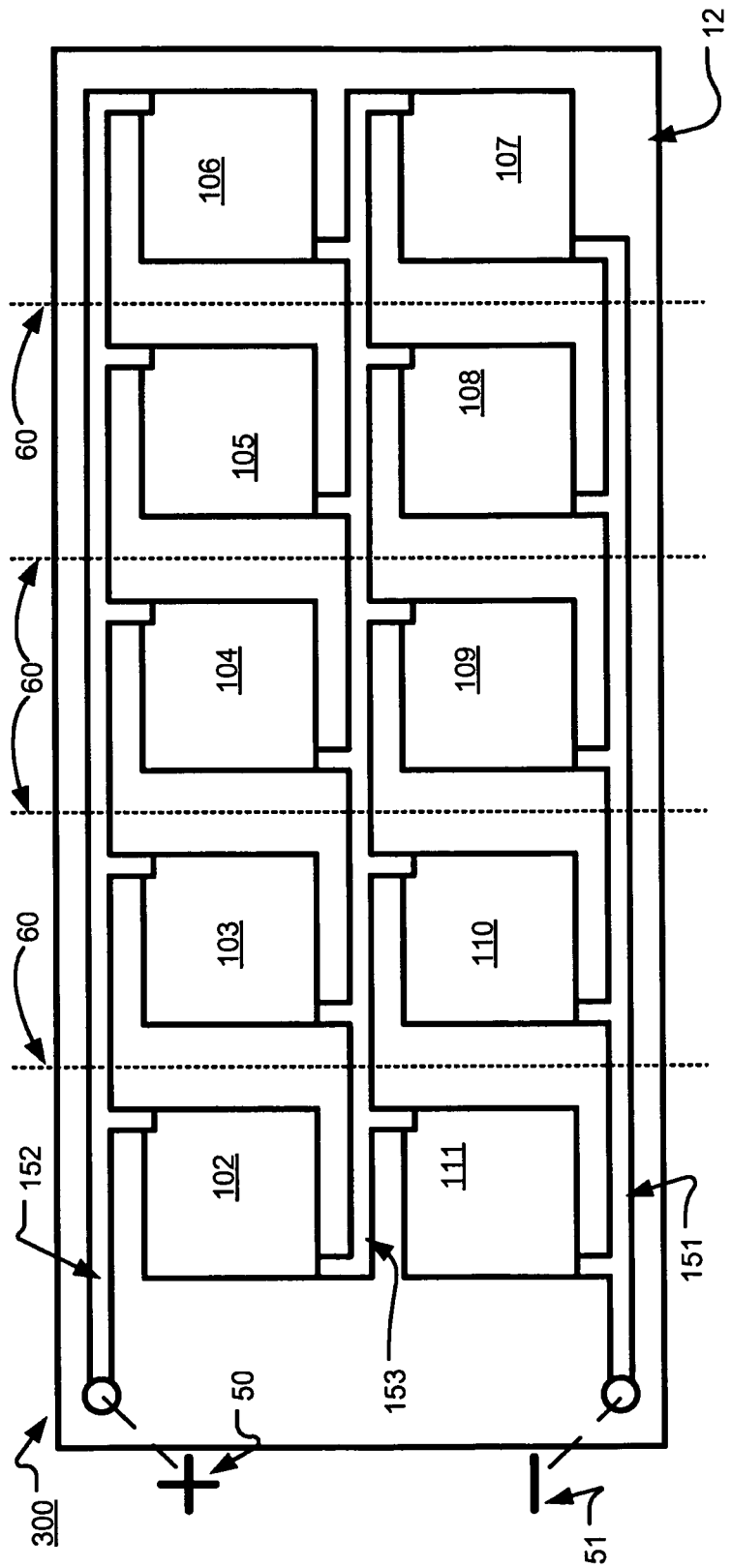

Presented here are exemplary electronic devices and methods of manufacture thereof which involve the use of lithium materials deposited on a flexible substrate to provide one or more flexible solid state lithium ion batteries having good structural and/or electrical or electrochemical characteristics. More particularly, provided here are simplified and stable flexible thin film solid state lithium ion batteries or similar such electrical devices, and processes for the fabrication thereof. Thin films here may include those on the order of about 25 microns, though both smaller and larger scales are with the present scope (e.g., up to and perhaps even exceeding about 50 microns in some cases). Note, low temperature processing (e.g., room temperatures), particularly using vacuum deposition or other thin film techniques and an inverted deposition sequence to achieve a lithium anode adjacent the substrate with lithium based electrolyte and cathode layers disposed thereover allows for use of flexible substrates in flexible battery production.

Referring now to the drawings, FIG. 1 provides a generalized view of an exemplary thin film electronic device 10 to or for which the developments hereof may be applied or used. More particularly, the electronic device 10 may include a flexible substrate 12 upon which may be disposed a first electrode layer 14 with an electrolyte layer 16 disposed thereon, and a second electrode layer 18 formed thereover. As formed and used herein, the substrate 12, and the solid state layers 14, 16 and 18 are flexible and together form a flexible device 10. When, as in a principle implementation hereof, such a device 10 is a battery, then, the electrodes 14 and 18 may be connected (directly or indirectly via discrete current collector layers or other conductive forms, none shown) to a circuit 20 to power a load 22; the circuit and load 20, 22 shown in dashed lines to demonstrate the optional and schematic representation thereof. In order to effect such a connection to a circuit 20, inter alia, some one or more electrically conducting contacts would be used, whether in the form of one or more thin film current collectors (e.g., anode and/or cathode current collectors, not shown) deposited on the substrate and/or an electrode, or through other connections as may be known in the art and those later developed.

Note also that a number of stacked layers could be formed on each other as shown in FIG. 2 such that a second or subsequent electronic device 11 could be formed over the base device 10; the second device 11 could include electrode layers 24 and 28 with an electrolyte layer 26 therebetween, not unlike the layers 14, 16 and 18 of device 10. An insulator layer 30 may be used herebetween as well to separate the devices, even though they may be connected electrically, as in series or parallel to increase current or voltage output. Alternatively, layer 30 may be one or multiple layers of electronic conductors, representing a shared current collector between the cathode of device 10 and the anode of device 11 for a series connected configuration.

As shown, the battery 10 of FIG. 1 may involve having the electrode underlayer 14 be the anode, and the electrode overlayer 18 be the cathode. This may be the reverse of and contrary to many conventional lithium thin film battery implementations (which would typically have the cathode adjacent the substrate), particularly, for example, those lithium thin film implementations having a lithium metal anode, which could not generally be manufactured in this fashion due to the instability and high reactivity of depositing a lithium metal first, with a lithium based electrolyte to be deposited thereover. However, as described here, such an arrangement can take advantage of certain fabrication techniques to achieve stability even in a flexible substrate environment. An example of this is shown more particularly in FIG. 3.

In FIG. 3, a slightly different form of electrode underlayer 34 is shown within the electronic device 100 hereof. In this case, the electrode layer is a buried anode 34 which may be formed according to the principles described in U.S. Pat. No. 6,805,999, which is incorporated herein by this reference as if fully set forth here for all that it teaches and suggests. More particularly, this version shown in FIG. 3 could be formed in such a manner that the electrolyte layer 16 and/or the electrode layer 18 are of a composite form of material that includes lithium that may be subsequently plated down onto the substrate 12 (or on an intervening layer, such as an anode current collector, not shown), as by electroplating by application of a voltage after formation of the electrolyte layer 16 and the cathode layer 18 (more details of such a process are set forth below and in the incorporated patent, U.S. Pat. No. 6,805,999). Note further, a current collector strip or trace 15 is also shown in FIG. 3 as this might be formed on the substrate 12, typically below the electrolyte layer 16 and the subsequently-formed buried anode 34.

Note, this activation or electroplating of the anode using an initial charging step in which a lithium metal anode 34 is formed between the substrate and the electrolyte, thereby produces a lithium-based thin film battery which is characterized by having the lithium metal layer buried in the structure of the battery (thus, the "buried anode"). Beneficially, this buried anode could be improved by additional layering or sealing thereover to protect it from the ambient environment as is often the case with other lithium metal anode structures, the lithium in such prior structures being highly reactive. In some cases, epoxy or some other protectant layer may be disposed on top of the battery assembly. Here again, this might be considered a reverse battery structure with the anode adjacent the substrate (though graphite or non-lithium based anodes used in lithium batteries have apparently been so disposed; of the lithium-type anodes, only buried lithium metal anodes are thus far known).

The process of fabrication hereof may use vapor deposition or other thin film fabrication steps to produce an air stable composite battery structure having an electrolyte layer and a cathode layer upon a flexible substrate. Either or both of the to-be-formed electrode layers may also have a current collector layer associated therewith as described below. The order of these layers, as viewed from the flexible substrate, is reversed from that of conventional thin film batteries, which will be further elucidated below. The flexible substrate of the battery composite structure serves as both a support for the composite structure and, in some cases as an insulator in the resultant thin film battery. The various layers hereof can be deposited using one or more such techniques as will be familiar to one skilled in the art after becoming familiar with the teachings herein, for example, evaporation, sputtering, chemical vapor deposition, or the like.

With continued reference to FIG. 3, the deposition of a reverse structure battery structure 100 can be carried out in about three deposition steps, building the functional layers upon the flexible substrate 12, which may be a polymer or a thin metal foil in many examples. First, in some cases, a flexible anode current collector 15 may be used and may be chosen for its electrical conductivity and its inert character toward attack by lithium metal, as well as its ability to be flexible as described further below. Thus, the current collector 15 may be, for example, a conductive metal, examples of which are copper, nickel, aluminum, and gold. Current collector 15 may also be a ferrous alloy, for example steel, by way of example, stainless steel, though flexibility in use will be a desired factor. Current collector 15 may also be a layer of any other conductive metal that is compatible with lithium metal, for example iron, or any transition metal that does not form intermetallic compounds with lithium. Typically, the current collector 15 will be a conductive film which has been deposited, for example, copper or gold on a polyester or other polymer substrate 12. Note, in some implementations, the substrate can be substantially unitary and/or act as both substrate and current collector, as when the substrate is a thin metallic foil or like material.

Then, onto substrate 12 (and over collector 15 if used) is deposited an electrolyte film layer 16 which may be chosen for its ability to be a facile conductor of lithium ions and for its stability when in contact with lithium metal. The electrolyte may be any solid state electrolyte that can be deposited by vacuum or other techniques that fulfills the criterion of facile lithium ion conduction and inertness toward lithium metal. One preferred electrolyte material is lithium phosphorous oxynitride (also known as LiPON).

Next, onto the exposed face of electrolyte film 16 is deposited cathode layer 18 which is formed of a material which may be any of the lithium intercalation materials which can reversibly eject lithium ions when charged and injecting lithium ions upon reduction; examples include lithium cobaltate ($LiCoO_2$), lithium manganate ($LiMn_2O_4$), lithium nickelate ($LiNiO_2$), and lithium vanadate ($LiV_2O_5$). These films can be deposited from sources containing lithium with subsequent elimination of the lithium insertion step, or from the transition metal oxide which is then subjected to a lithium insertion step. Often, the method of fabricating a cathode layer 18 will include layered oxidation, i.e., the deposition of a transition metal oxide layer of desired thickness followed by lithiation of the transition metal oxide. This process permits a cathode layer 18 thus formed to contain a supra-stoichiometric amount of lithium which can be made available for formation of a lithium anode when the battery structure 100 is subjected to an activation or electro-plating step (described briefly above and further below). Lithiation of the oxide film can be accomplished by treating the transition metal oxide film with lithium vapor. Cobalt and vanadium are alternative preferred transition metals from which the oxide layer may be formed. As one non-limiting example, a suitable vanadium oxide-based cathode layer 18 can be formed by first depositing a layer of $V_2O_5$ onto the exposed face of electrolyte layer 16 by, for example, reactive ion sputtering from a vanadium target in the presence of oxygen. Following this, lithium metal can be vacuum evaporated or otherwise deposited onto the vanadium oxide layer, thus lithiating the oxide layer.

Other thin film deposition techniques as will be familiar to one skilled in the art (e.g., electrodeposition or metal organic deposition, inter alia) can be employed to deposit the various layers hereof. In particular, several alternative techniques can be used to deposit a cathode layer 18, both in cases where the layer is a stoichiometric lithium transition metal oxide, and in cases where the layer contains a supra-stoichiometric amount of lithium metal.

Note, in solid state, thin film lithium ion batteries, a large variety of materials are and have been used for the respective electrodes. Commonly, cathodes (positive electrodes that power conventional lithium-ion batteries) have included lithiated metal oxides such as lithium cobalt oxide ($LiCoO_2$), or oxides of other metals such as manganese ($LiMnO_2$ or $LiMn_2O_4$) and nickel (LiNiO) or spinels or composites thereof (e.g., of two or more of cobalt, manganese or nickel), or lithiated metal phosphates such as lithium iron phosphate ($LiFePO_4$). The anode (negative electrode into which the $Li^+$ ions insert during charging of the battery and from which the $Li^+$ ions move or are extracted during discharge of the battery) may be of many materials also; however, the buried anode example will typically involve a lithium metal form though other anode materials may be useful as well. The solid state electrolyte in a solid state lithium ion battery may also come in a variety of different materials, providing mainly for a solid form and for good $Li^+$ ion transport properties. Some early examples might include Lithium Iodide (LiI) and Lithium Phosphorus Oxynitride (LiPON). Solid polymer separators may also be included, such polymers having transport capacity often due to having a lithium salt disposed therein as known in the state of the art. Work has also been performed with lithium and halide materials, particularly, in some examples, a lithium aluminum tetrahalide such as lithium aluminum tetrafluoride ($LiAlF_4$).

In a possible further step following the two primary film deposition steps (electrolyte 16 and electrode 18) and the lithiation step (if discretely used), a further cathode current collector film (not shown) may in some cases be deposited onto cathode film 18. Although such a cathode current collector film may be any electrically conductive metal that is inert toward the cathode material, aluminum, gold, and copper may be among the more preferred. Other conductive elements could alternatively be used.

A battery of the type shown in FIG. 3 with a buried anode (not yet formed) may be fully formed by activating the multi-layer battery structure 100 to "electro-plate" the buried anode onto the substrate 12. This activation may include applying a source of sufficient electromotive force (emf) of constant polarity between substrate layer 12 (typically via a current collector 15 or like conductor) and the cathode layer 18 (typically, if used, a cathode current collector (though not shown here)). With reference to FIG. 3, in this manner, material in cathode layer 18 is oxidized. During this oxidation, lithium ions are ejected from cathode layer 18 and are conducted through the electrolyte layer 16. The lithium ions are subsequently electrochemically reduced to lithium metal at the electrolyte 16/substrate 12 interface, thus forming the buried lithium metal anode layer 34. This layer is termed buried because it is formed in such a manner that it is never exposed to the ambient environment, but is instead formed within the structure of the battery composite material, and protected afterward by the substrate 12 beneath it (as shown in FIG. 3) and by the other multiple layers above it. Current is passed into the device in this manner until a lithium anode layer of sufficient thickness has been formed.

Once the activation/electroplating step is completed, thus depositing buried anode layer 34 of the desired thickness, battery 100 has a configuration which is inverted from that of many conventional lithium thin film batteries (herein, "reverse configuration"). This reverse configuration provides for a "buried anode" structure that both protects the anode, without additional protective layers, and provides for a battery that withstands exposure to the ambient environment and can withstand moderate thermal excursions (to about 250° C.) without deterioration.

Thus, above-described is a process of producing a flexible, lithium based, thin film battery. A summary view of a general process 40 hereof is shown in FIG. 4. Exemplary process 40 generally includes the operations of preparing a flexible substrate (operation 41); forming an electrolyte layer (operation 42); forming an electrode (operation 43); and, forming a buried electrode (operation 44). Note, these each may take a variety of forms, and may take place sequentially, or in some cases substantially simultaneously. The preparing step may include merely setting the substrate in a deposition chamber, or may be more involved in the actual formation of a substrate, or in cleaning, or in laying flat, or even in deposition of a base layer prior to the electrolyte layer, as in depositing an anode current collector (if used). Each of the forming steps may include the mere formation, or may involve other preparatory or finishing or intervening steps, as for example, merely involving deposition of the appropriate material, or in performing mask changing or the like.

An alternative exemplary process may include the operations of a) depositing a film comprising a solid state electrolyte material that is a conductor of lithium ions onto an exposed face of a flexible substrate; b) depositing a film of a transition metal oxide onto the electrolyte material; c) forming a cathode film layer by lithiating the transition metal oxide film until it contains a supra-stoichiometric amount of lithium; d) depositing an electron-conductive current collector film upon the cathode film layer; and, e) forming a lithium metal buried anode layer between the conductive face of the substrate and the solid state electrolyte material. Of course, in some implementations, the forming of a buried anode may include using a flowing current between the substrate conductive face and the cathode current collector, in the process oxidizing the cathode film layer and causing lithium ions to migrate into and through the solid state electrolyte material, and then to be reduced to lithium metal and forming said buried anode layer; and maintaining the current flow until the buried anode layer contains a desired amount of lithium metal.

As introduced above, further present developments involve provision of flexible lithium-based thin film solid state batteries. As described above, such flexible thin film batteries hereof can be fabricated by sequential thin film deposition techniques to effect the application of the several film layers required to form a complex structure which is then subjected to an activation step, and thereafter functions as a flexible thin film lithium-based battery. The battery structure as described here may be either or both oxygen and water vapor stable and thermally robust. As a consequence the battery structure can be manipulated without isolation from the ambient environment and can withstand the elevated temperatures associated with electronic device processing. Thus, for example, the battery structure can withstand incorporation into circuit boards or other electronic or electrical subassemblies prior to soldering and/or encapsulation of the subassembly without utilizing any special environment, isolation steps, or heat sinking devices to protect it. Moreover, the fabrication techniques hereof and materials chosen herefor can be manipulated at temperatures low enough (e.g., room temperatures) for processing with a number of flexible substrates, e.g., polymers.

Moreover, according to the developments hereof, the flexible thin film batteries hereof may be used to produce bulk battery properties through new structural arrangements of the battery films, e.g., either through enlarged areas flexibly managed or through stacking (see the FIG. 2 version, e.g., although buried anodes could be formed thus as well) or both in some implementations. In particular, the flexible materials, including flexible substrates hereof allow for stacking or rolling of thin film batteries in a way such that the storage density of such structures can rival bulk batteries while retaining the beneficial attributes of the thin film batteries (e.g., long cycle life, inherent safety, high charge and discharge rates).

In particular, as shown in FIGS. 5 and 6, flexible batteries 100 having flexible lithium materials on flexible substrates can be manipulated into a variety of shapes, including for example, the jellyroll of FIG. 5 and the folded implementation of FIG. 6. As shown in each of these examples, a substrate 12 having the two primary layers of the electrolyte 16 and the cathode layer 18 (buried anode 34 not shown here due to its hidden nature within the electrolyte 16, though it may have been formed before or perhaps even after the manipulations shown here) disposed thereon can be manipulated into different final forms (in each of these examples, the batteries 100 are in process of moving from a substantially flat form (used during the layer depositions) toward their final rolled or folded forms, respectively). In each of these examples of FIGS. 5 and 6, the lithium material layers 16, 18 would preferably be formed substantially co-extensive with the width and breadth of the substrate 12 (though some reduced area of the lithium overlayers may improve handling and/or insulation as will be appreciated by those of skill in this art), hereby enlarging if not maximizing the amount of reactive lithium in a particular battery structure, and thus also maximizing current and/or voltage capacity. In such structures, the current could then be collected (or deposited) at respective opposite corners as shown by the respective positive and negative contacts 50, 51 (schematically represented by the respective positive and negative signs + and −) on/at the respective cathode and anode layers. A current collector or other means or conductors could be used at each of these points, as would be understood. Note, in the jellyroll example of FIG. 5, the substrate 12 may also serve as an insulator, for as the device 100 is rolled onto itself, the cathode layer 18 only comes into contact with the underside of the substrate 12. For the folded version of FIG. 6, the substrate 12 may also function as an insulator, however, it may be that a further insulating overlayer (not shown) might desirably be added over the cathode layer 18 to eliminate any undesirable contact. Note also the fold lines 60 of the folded version, these being spaced apart to yield the desired end-product shape, whether square, rectangular or otherwise.

Further geometric manipulations which could allow for getting around any potential bending limitations may also be available. For example, the use of discrete batteries deposited on thin flexible substrates such that rolling and folding can be accomplished without hampering or possibly even destroying electrical and mechanical integrity of the structure whole or of the individual parts. In one example, as shown in FIG. 7 (FIG. 7a showing a pre-folded form, and FIG. 7b showing folded), discrete battery units 102-106 may be deposited onto a flexible substrate 12 to provide the desired flexibility for a composite device 200. Discrete batteries 102, 103, 104, 105 and 106 can be formed by using masks in the deposition process (and may appear not substantially different from those forms schematically shown in FIGS. 1, 2 and 3, e.g.), and further may include metallization (see e.g., conductive traces 151, 152) connecting the individual elements, either in parallel (as shown) or in series (not shown in FIG. 7, but see a series connection in, e.g., FIG. 8 described below). Note, the respective cathode and anode connection points 50, 51 may be disposed at any of various points along the metallization. By choosing metals of both high conductivity and ductility, the connecting metallization traces 151, 152 can be thin and flexible, so that they can survive bending at relatively small radii of curvature. Note the slightly exaggerated overlap portions 151a and 152a shown in FIG. 7b as these would appear over the fold line. FIG. 7a also illustrates several separate fold lines 60 which demonstrate where the folds might take place. A folded form is shown in FIG. 7b. This flexibility may allow folding patterned polymer sheets into compact shapes that the battery material itself perhaps could not or into a shape which might otherwise not be as effective or efficient. This example 200 represents the folded device where each finally folded square 200 (see FIG. 7b) has a total of five (5) devices, one stacked on top of another for a total of five batteries, all connected in parallel. Voltage output is the same as one device, but the charge capacity is increased by five times.

Figure 8B:
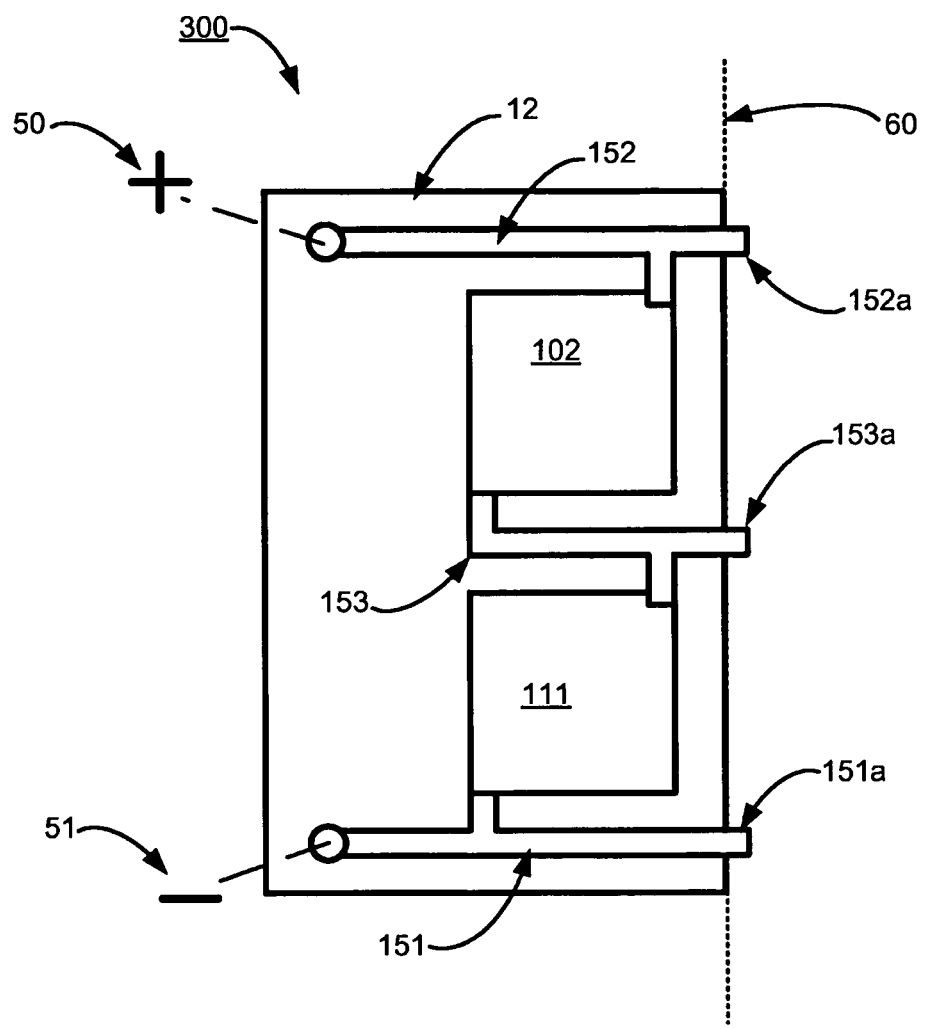
Figure 8C:
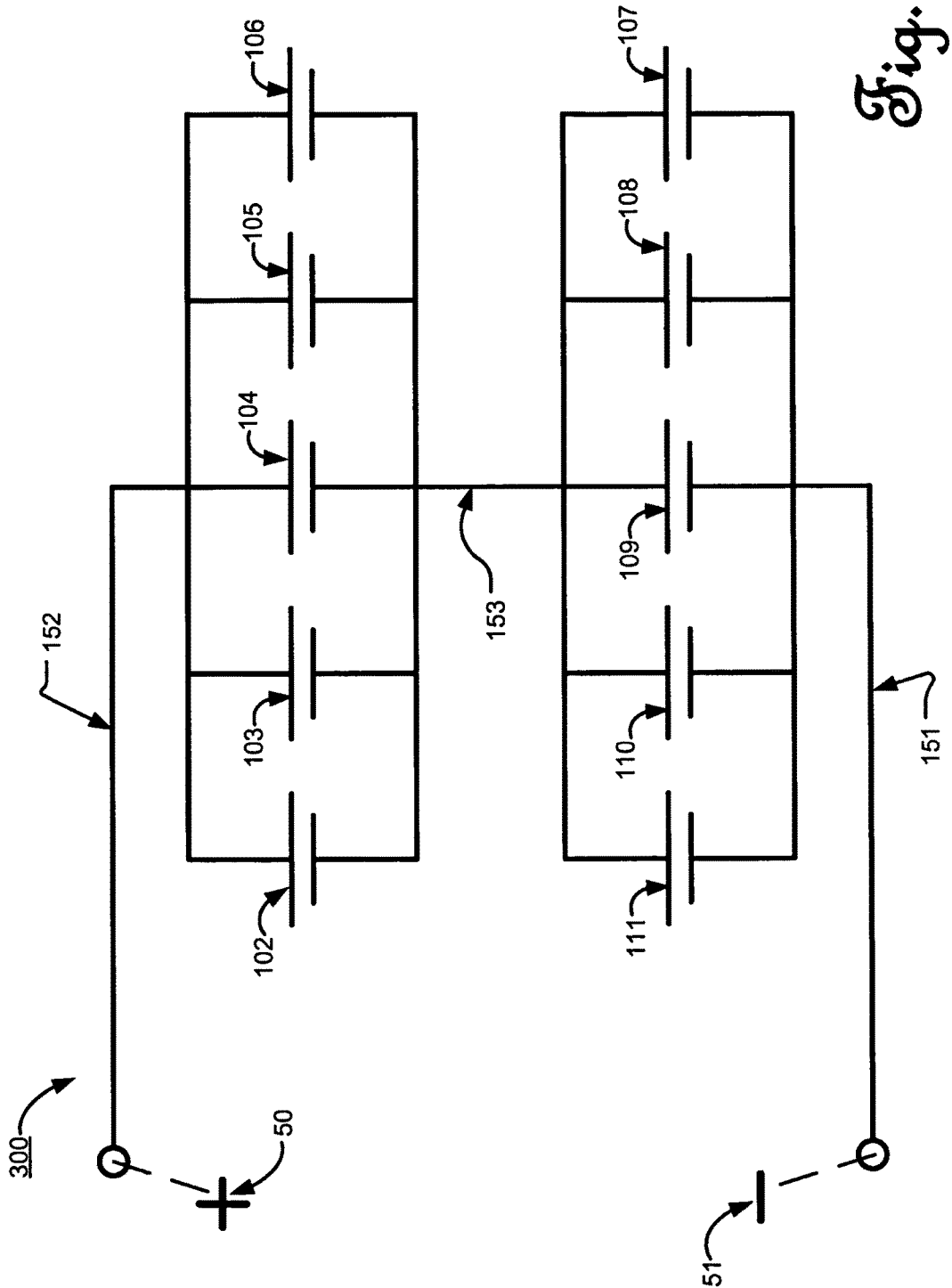

Another example is shown in FIG. 8 (unfolded in FIG. 8a, and folded in FIG. 8b). Battery units, cells or pods 102, 103, 104, 105, 106, 107, 108, 109, 110 and 111 are shown in forming an overall device 300. Like device 200 of FIG. 7, this device has five pods or cells (102-106) connected in parallel so that the voltage capacity of this bank (102-106) of cells will remain the same as any one cell but the charge capacity will be multiplied by five times that of one of the pods individually. Moreover, with a proper pattern of interconnection of traces, each battery cell could be arranged in parallel or series with any other battery. Thus one could use this array of ten cells (FIG. 8) to increase the voltage output of the resultant folded stack 300 as well. For instance, five batteries could be connected in parallel (as shown, top row, 102-106), while five others (e.g., 107-111) are connected in parallel with each other, yet in series with the top row via the common conductive trace 153. Each of the two groups of five parallel connected cells could thus be connected in series with each other. Such an arrangement would produce two times the voltage of one cell and five times the charge capacity (see also the schematic circuit diagram of FIG. 8c). Other arrangements are obvious as well by re-defining the interconnect geometry of the traces. Also with fold lines placed as illustrated, only the ductile conductor strips 151, 152 and 153 are making bends with a tight radius of curvature, preserving the mechanical integrity of each thin film battery stack. Note however the traces overlap once more often in the FIG. 8 example over the FIG. 7 example, i.e., at each fold 60, here at points 151a, 152a and further at point 153a.

Note, the examples in both FIGS. 7 and 8 show schematically the top conductor of each cell connected to each other (e.g., trace 152 overlaps each cell, thereby indicating connection to the top layer, or current collector of each cell; see e.g., layers 18 of FIGS. 1 and 3). These top row connections are then connected to cathodic output 50 by trace 152. Similarly, the trace 151 connects the underlayers or anode layers (see e.g., underlayers 14 in FIGS. 1 and 3) with each other (in the bottom row of FIG. 8). This is indicated schematically by non-overlapping or under-lapping of the trace connections to each cell. Then, trace 153 connects the anode layers of the top row of cells 102-106 in the FIG. 8 example, with the cathode layers of the bottom row of cells 107 to 111 of the device 300. Again see the circuit schematic of FIG. 8c. Alternatives in trace connections could also be arranged in myriad ways, e.g., the top trace in the bottom row of a FIG. 8 type device could be otherwise connected to the bottom conductor in the top row to thus arrange two groups of cells in parallel.

Then in a further set of examples, by combining the geometric concepts of FIGS. 5, 6, 7 and/or 8 with the stacking concepts (see e.g., FIG. 2), it may be possible to make even more compact constructions on flexible polymer substrates. One may achieve this by using masks during deposition to build up two or more layers of batteries (as described for FIG. 2, above), such stacks connected within themselves either in parallel or in series, while also laying out an overall construction geometry. This may result in increased power density per unit area of the substrate material by eliminating substrate materials and sharing current collectors.

The results include new ways of arranging thin film battery structures using flexible thin films on thin, flexible substrates. This allows stacking or rolling of thin film batteries in a way such that the storage density of such structures can rival bulk batteries while retaining the beneficial attributes of the thin film batteries (e.g., long cycle life, safety, etc.). The present developments are thus directed toward fabrication of flexible electrochemical devices such as flexible thin film batteries or combinations of battery structures, and toward methods of producing lithium based batteries which may be air stable with the application of a simple protective overlayer following the formation of the anode, cathode, and electrolyte layers and charging of such a battery. Low temperature processing (e.g., room temperatures) allows for use of polymer or like flexible substrates.

Another aspect hereof may be a flexible lithium battery, characterized by its ability to form a buried lithium anode layer at the interface between an anode current collector and an electrolyte when a current is maintained between the anode current collector and the cathode current collector, and its ability to be chemically stable when exposed to an ambient environment (e.g., including oxygen, the lithium being stabilized and not reactive in the ambient environment), the battery having an anode current collector layer that forms a support and has at least one conductive face; an electrolyte layer that is a conductor of lithium ions and has one face in communication with a conductive face of the anode current collector layer; a cathode layer that is in communication with a face of the electrolyte layer that is not in communication with the anode current collector layer; and a cathode current collector layer that is in communication with a face of the cathode layer that is not in communication with the electrolyte layer.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

The invention claimed is:
1. An electrochemical device comprising:
a flexible anode layer;
a flexible cathode layer comprising a spinel material;
a solid flexible electrolyte layer comprising lithium iodide; and
a flexible insulating layer positioned in direct physical contact with the flexible cathode layer, wherein:
the solid flexible electrolyte layer is positioned between the flexible anode layer and the flexible cathode layer,
the flexible anode layer and the flexible cathode layer are both in direct physical contact with the solid flexible electrolyte layer,
the flexible anode layer, the flexible cathode layer, the solid flexible electrolyte layer, and the flexible insulating layer form a flexible structure,
the flexible structure has at least one of a bend or a fold,
the flexible anode layer, the flexible cathode layer, and the solid flexible electrolyte layer each have electrical and mechanical integrity at the at least one of the bend or the fold, and
the flexible insulating layer prevents the flexible cathode layer from bending or folding onto itself at the bend or the fold.

2. The electrochemical device of claim 1, wherein the flexible anode layer, the flexible cathode layer, and the solid flexible electrolyte layer each have a thickness between greater than zero microns and 50 microns.

3. The electrochemical device of claim 1, wherein the solid flexible electrolyte layer is lithium ion conductive and at least one of the flexible anode layer or the flexible cathode layer is lithium ion insertive.

4. The electrochemical device of claim 1, wherein the flexible cathode layer is lithiated and the solid flexible electrolyte layer is lithium-based.

5. The electrochemical device of claim 1, wherein the flexible cathode layer further comprises at least one of a lithiated metal oxide, a lithium-containing metal oxide, or a metal composite.

6. The electrochemical device of claim 1, wherein the solid flexible electrolyte layer further comprises at least one of a polymer having $Li^+$ transport capacity, a polymer having a lithium salt disposed therein, a lithium and halide composite material, or a lithium aluminum tetrahalide.

7. The electrochemical device of claim 1, wherein the flexible anode layer comprises a lithium metal.

8. The electrochemical device of claim 1, further comprising a current collector in direct physical contact with the flexible anode or the flexible cathode.

9. The electrochemical device of claim 1, wherein the flexible structure is configured as a roll such that the flexible anode layer, the solid flexible electrolyte layer, and the flexible cathode layer are rolled into a form of a jelly-roll.

10. The electrochemical device of claim 5, wherein the spinal material comprises at least one of a nickel spinel material, a manganese spinel material, or a cobalt spinel material.

11. The electrochemical device of claim 6, wherein the lithium aluminum tetrahalide comprises $LiAlF_4$.

12. The electrochemical device of claim 1, further comprising a flexible substrate layer in direct contact with the flexible anode layer.

13. The electrochemical device of claim 12, wherein the flexible substrate layer comprises at least one of a polymer or a thin metal foil.

14. The electrochemical device of claim 1, wherein the flexible cathode further comprises at least one of $LiCoO_2$, $LiMnO_2$, $LiMn_2O_4$, $LiNiO$, a lithiated metal phosphate, or $LiFePO_4$.

* * * * *